Patented Sept. 3, 1935

2,013,298

UNITED STATES PATENT OFFICE 2,013,298

CELLULOSE ETHER COMPOSITION

Bozetech C. Bren, Cedar Grove, N. J., assignor to Du Pont Viscoloid Company, Wilmington, Del., a corporation of Delaware No Drawing. Application December 28, 1933, Serial No. 704,233

8 Claims. (Cl. 106—40)

This invention relates to new compositions of cellulose derivatives and, in particular, to the preparation of plastics, solutions, and coating compositions of cellulose ethers.

Heretofore the manufacture of plastics, solutions, and coating compositions from ethers of cellulose, such as ethyl and benzyl cellulose, has suffered from the handicap of the lack of an altogether satisfactory plasticizer for derivatives of this type.

The substances heretofore used as plasticizers have included those of the ester type, such as triacetin, dimethyl phthalate, diethyl phthalate, dibutyl phthalate, et cetera, and those of the triaryl phosphate type, such as triphenyl phosphate and tricresyl phosphate.

None of these plasticizers has fully met the requirements of the case, the principal requirements of which are that the plasticizer shall not confer an odor upon the resulting product, that it shall not, as a result of volatility, gradually disappear from the product, that it shall not be subject to extraction from the product by water, that it shall not result in discoloration of the product, either directly or upon subjection to light or heat, and finally, that it shall preferably exert a fire-retardant effect and thus reduce the rate of burning of the product. In none of the plasticizers heretofore applied to the manufacture of plastics, solutions, and coating compositions of the cellulose ethers have all of these requirements been met. Thus, for example, the triaryl phosphates have the desirable fire-retardant effect but induce discoloration. The phthalate esters confer their characteristic odors upon the product and are, furthermore, objectionably volatile. Triacetin, likewise, suffers some loss through its volatility and is also sufficiently soluble in water so that the product containing it suffers loss by extraction in contact with water.

An object of this invention is the preparation of cellulose ether plastics, solutions, and coating compositions of improved quality. A further object is to produce compositions of this type which shall be free from odor, from loss of plasticizer by evaporation or by extraction, and which are of good color and free from tendency to be discolored by heat or by light. A further object is to produce satisfactory products of this type having a low rate of burning. Still further objects will be apparent from the description of the invention given hereinafter.

These objects are accomplished according to the present invention by incorporating, with a cellulose ether, such as ethyl cellulose, benzyl cellulose, butyl cellulose, and the like, in the manufacture of plastics, solutions, and coating compositions, one or more of the thiotriaryl phosphates, as, for example, thiotriphenyl phosphate and thiotricresyl phosphate.

It is to be understood that the thiotriaryl phosphates are esters of phenol or its homologues with ortho thiophosphoric acid:

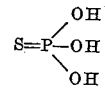

Actually these compounds are formed from the thiophosphoryl chloride, $$S=P\equiv Cl_3.$$

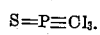

Thus the general formula for this class of compounds, where R represents an aryl group is $$S=P\equiv(OR)_3.$$

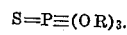

These compounds are not to be confused with those esters of orthophosphoric acid and thiophenols or their homologues.

The following examples are given in order to illustrate specific embodiments of the present invention, parts being given by weight:

Example 1

| | Parts |
|---|---|
| Ethyl cellulose | 100 |
| Thiotriphenyl phosphate | 12.5 |
| Denatured alcohol | 80 |
| Ethyl acetate | 20 |

Example 2

| | Parts |
|---|---|
| Benzyl cellulose | 100 |
| Thiotricresyl phosphate | 35 |
| Toluene | 60 |
| Ethyl acetate | 15 |

Example 3

| | Parts |
|---|---|
| Butyl cellulose | 100 |
| Thiotriphenyl phosphate | 10 |
| Triphenyl phosphate | 10 |
| Benzol | 80 |
| Ethyl alcohol | 20 |

Example 4

| | Parts |
|---|---|
| Ethyl cellulose | 100 |
| Thiotriphenyl phosphate | 15 |
| Gum copal | 20 |
| Bayberry wax | 10 |
| Benzol | 80 |
| Alcohol | 20 |

Example 5

| | Parts |
|---|---|
| Ethyl cellulose | 100 |
| Thiotricresyl phosphate | 33 |
| Mineral filler | 100 |

Example 6

| | Parts |
|---|---|
| Ethyl cellulose | 100 |
| Thiotricresyl phosphate | 10 |
| Gum copal | 10 |
| Carnauba wax | 1 |
| Benzol | 720 |
| Alcohol | 180 |

It will be understood that the above examples are merely illustrative of the invention which broadly comprises the use of a thiotriaryl phosphate as a plasticizer in cellulose ether compositions. The ingredients and proportions in the above examples may be widely varied as those skilled in this art will appreciate. In general, the proportions will fall within the following range:

| | Parts by weight |
|---|---|
| Cellulose ether | 100 |
| Thiotriaryl phosphate | 5–35 |
| Volatile solvent | 0–900 |

The use of thiotriaryl phosphates in accordance with the present invention necessitates no change in the technique of manufacture of products of the type contemplated. The general methods well known in the plastics and lacquer fields are directly applicable.

Thus, in making up products by any of the Examples 1–4, the ingredients as given are macerated and kneaded in a dough mixer, or other well known mixer, using the specific volatile solvent mixtures given, or using any other suitable mixtures of solvents, including such solvents as carbon tetrachloride, ethylene dichloride, monomethyl ether of glycol, benzyl alcohol, and the like, well known in the art. The resulting colloid is then worked up into finished shapes in accordance with the usual practice, as for example, by successive operations of filtering, rolling, pressing, and sheeting, or extrusion into the form of tubes or rods.

With respect to Example 5, it is permissible to combine the non-volatile ingredients in any suitable manner and to shape the resulting mass into the desired form by pressure, or by pressure and heat without the use of volatile solvent.

In the case of a dope or coating composition as in Example 6, the non-volatile ingredients may be put into solution in the volatile solvents by the use of well known equipment and methods.

The solvent mixtures in the above examples may be substituted in part or wholly by other solvents commonly used in the manufacture of cellulose ether plastics and coating compositions. Likewise auxiliary plasticizers or softeners may be used to partially replace the thiotriaryl phosphate. Among such plasticizers may be mentioned dibutyl phthalate, dimethyl phthalate, chlornaphthalenes, chlordiphenyls, ethyl paratoluenesulfonamid, camphor, acetanilid, and the like. Resins and waxes other than disclosed in the specific examples may be used, such as ester gums, coumarons, sulfonamid-formaldehyde, resins, phenol-formaldehyde resins, and natural resins and waxes, as for example, gum dammar, japan wax, sandarac, gum accroides, and the like. A wide variety of fillers may be used in these compositions, including barytes, rottenstone, titanium dioxide, talc, wood flour, cellulose, et cetera. To produce varied colored effects both synthetic dyestuffs and mineral colors may be employed, as is customary.

These thiotriaryl phosphates may be used in the production of cellulose ether compositions of all types. Thus they may be used in the manufacture of plastic compositions formed as sheeting, rods, tubes, et cetera, and fabricated into articles of all sorts, such as novelties, safety glass interlayers, sound records, textile rollers, dentures, et cetera. Cellulose ether compositions used in solution form and containing the thiotriaryl phosphates may be used in the form of lacquers, dopes, and the like, which may be utilized for coating of wood, glass, metal, fabrics, et cetera, for impregnation, for laminating, for the manufacture of film by casting, et cetera.

Compounds and products of cellulose ethers plasticized with the thiotriaryl phosphates, in contradistinction to the cellulose ether compounds plasticized with substances heretofore known for that purpose, are characterized by permanent flexibility and durability under normal or accelerated ageing tests, or under the influence of sunlight, or of weather conditions. The low vapor pressure of these thiotriaryl phosphates has the result that the products in which they are used are singularly free from loss of plasticizer by evaporation, which loss has been a continual cause of annoyance and damage in cellulose ether compounds made with many of the plasticizers heretofore used. The insolubility of the thiotriaryl phosphates in water and their insensitivity to water have the result that the cellulose ether products plasticized with these compounds are of remarkably reduced sensitivity to water in comparison with cellulose ether plastics heretofore known, upon which latter water has frequently had a detrimental effect either as a result of hydrolysis of the plasticizer or as a result of extraction of plasticizer from the compound by water, with consequent warpage and changes of dimensions. The thiotriaryl phosphates furthermore produce no color in the cellulose ether compounds, either directly or through inducing a sensitivity to light or to heat, which has been a frequent failing of the cellulose ether compounds heretofore made. A further advantage of the thiotriaryl phosphates as compounding ingredients with cellulose ethers is the fact that they are entirely free from odor and make possible the production of a plastic which likewise is odorless. This has been impossible with many of the plasticizers heretofore used. Furthermore, the thiotriaryl phosphates exert a positive and powerful fire-retardant effect.

It will thus be evident to those familiar with the prior art in the field that the thiotriaryl phosphates used as plasticizers in compounds of cellulose ethers exhibit a combination of uniformly excellent properties, no such combination of which is found in any of the plasticizers heretofore used.

As many apparently widely different embodiments of this invention may be made without departing from the spirit and scope thereof, it is to be understood that the invention is not limited to the specific embodiments thereof except as defined in the appended claims.

I claim:

1. A composition comprising a cellulose ether and, as a plasticizer therefor, a thiotriaryl phosphate from the group consisting of thiotriphenyl and thiotricresyl phosphates.

2. A composition comprising a cellulose ether and, as a plasticizer therefor, a thiotriaryl phosphate from the group consisting of thiotriphenyl and thiotricresyl phosphates, in the proportion of 5–35 parts by weight of plasticizer to 100 parts by weight of the cellulose ether.

3. A composition comprising a cellulose ether and, as a plasticizer therefor, thiotriphenyl phosphate.

4. A composition comprising a cellulose ether and, as a plasticizer therefor, thiotricresyl phosphate.

5. A composition comprising ethyl cellulose and, as a plasticizer therefor, a thiotriaryl phosphate from the group consisting of thiotriphenyl and thiotricresyl phosphates.

6. A composition comprising ethyl cellulose and, as a plasticizer therefor, a thiotriaryl phosphate from the group consisting of thiotriphenyl and thiotricresyl phosphates, in the proportion of 5–35 parts by weight of plasticizer to 100 parts by weight of ethyl cellulose.

7. A composition comprising ethyl cellulose and, as a plasticizer therefor, thiotriphenyl phosphate.

8. A composition comprising ethyl cellulose and, as a plasticizer therefor, thiotricresyl phosphate.

BOZETECH C. BREN.